United States Patent [19]

Takahara et al.

[11] 4,126,886
[45] Nov. 21, 1978

[54] JITTER CORRECTING SYSTEM USING A PSEUDO COMPOSITE VIDEO SIGNAL FOR USE IN A VIDEO REPRODUCTION APPARATUS

[75] Inventors: Ichiro Takahara, Kadoma; Hiroyoshi Hashimoto, Neyagawa, both of Japan

[73] Assignee: Sanyo Electric Co., Ltd., Osaka, Japan

[21] Appl. No.: 714,904

[22] Filed: Aug. 16, 1976

[30] Foreign Application Priority Data

Aug. 25, 1975 [JP] Japan .................................. 50-103202
Feb. 9, 1976 [JP] Japan .................................. 51-14246

[51] Int. Cl.² ............................................. H04N 5/795
[52] U.S. Cl. ........................................ 360/37; 360/36
[58] Field of Search ..................... 360/36, 37, 33, 26; 358/127, 128, 8, 158, 159, 195

[56] References Cited

U.S. PATENT DOCUMENTS

| 3,575,666 | 4/1971 | Fischman | 358/159 |
| 3,681,522 | 8/1972 | Tanabe | 360/37 |
| 3,758,710 | 9/1973 | Crosno | 360/36 |
| 3,758,711 | 9/1973 | Crosno | 360/36 |
| 3,761,605 | 9/1973 | Makara et al. | 360/36 |
| 3,846,584 | 11/1974 | Itoh et al. | 360/37 |

Primary Examiner—Raymond F. Cardillo, Jr.

Attorney, Agent, or Firm—Armstrong, Nikaido, Marmelstein & Kubovcik

[57] ABSTRACT

A jitter correcting system is provided in a video reproducing apparatus for reproducing a composite video signal of a given standard television system to be connected to a monitor television receiver including an automatic frequency control for a horizontal oscillator, comprising a circuit for phase modulating the horizontal synchronizing signal of the reproduced composite video signal, by the amount associated with the phase difference between the composite video signal to be applied to the picture tube of the monitor television receiver and the output signal of the automatic frequency control of the monitor television receiver, for providing a modified composite video signal a phase modulated horizontal synchronizing signal. The system further comprises a circuit for generating a pseudo video composite signal including vertical and horizontal synchronizing signals and a marking signal in the video signal phase region wherein the horizontal synchronizing signal has been phase shifted as compared with that of the standard television system of the video reproducing apparatus for applying the said pseudo composite video signal through the jitter correcting system to the monitor television receiver, whereby the phase modulating circuit can be adjusted while observing the marking indication caused by the marking signal appearing on the screen of the picture tube.

12 Claims, 11 Drawing Figures

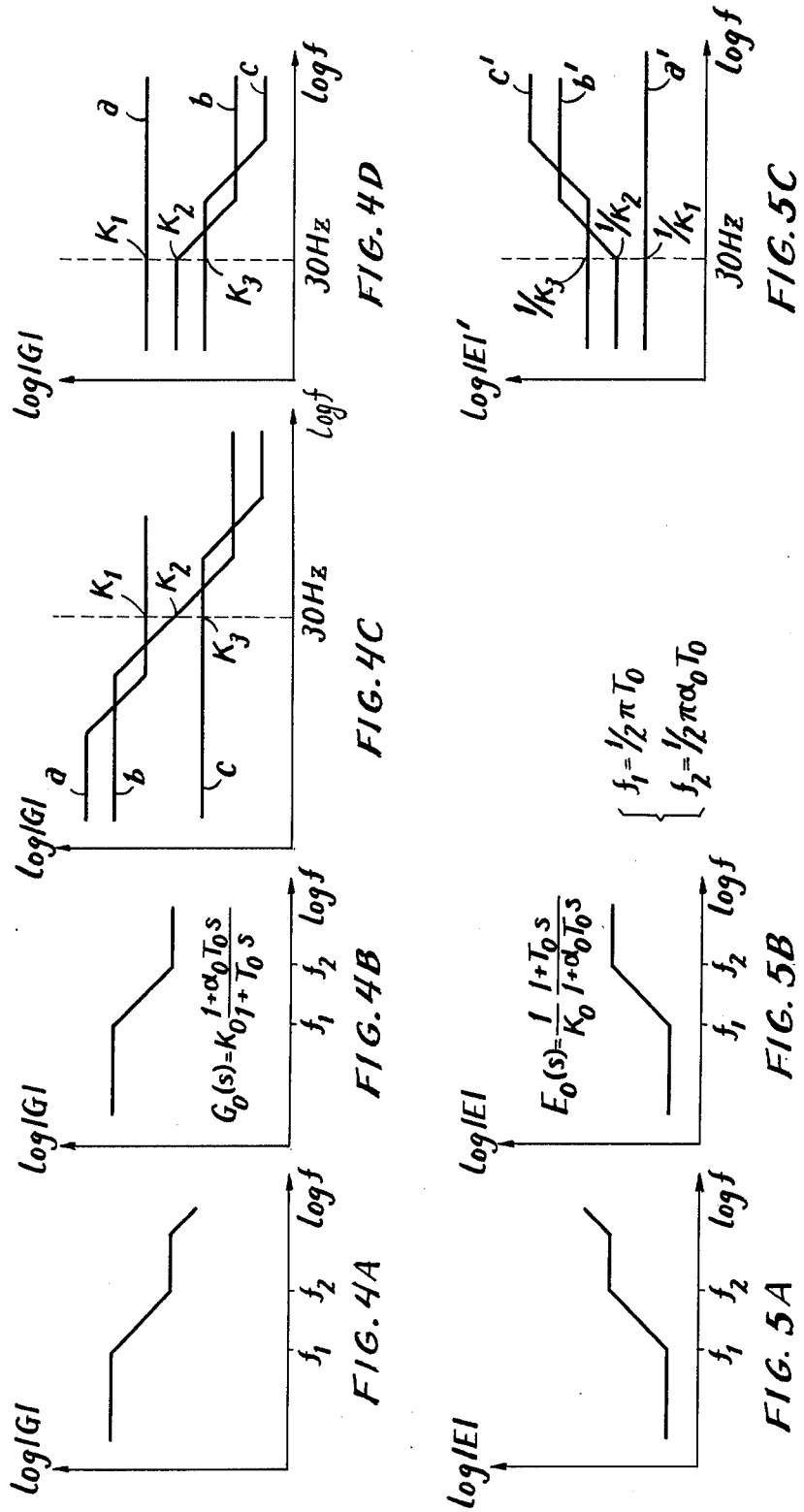

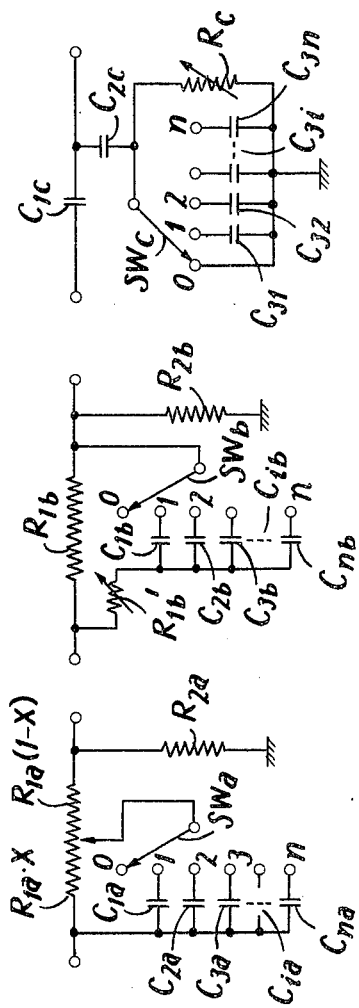
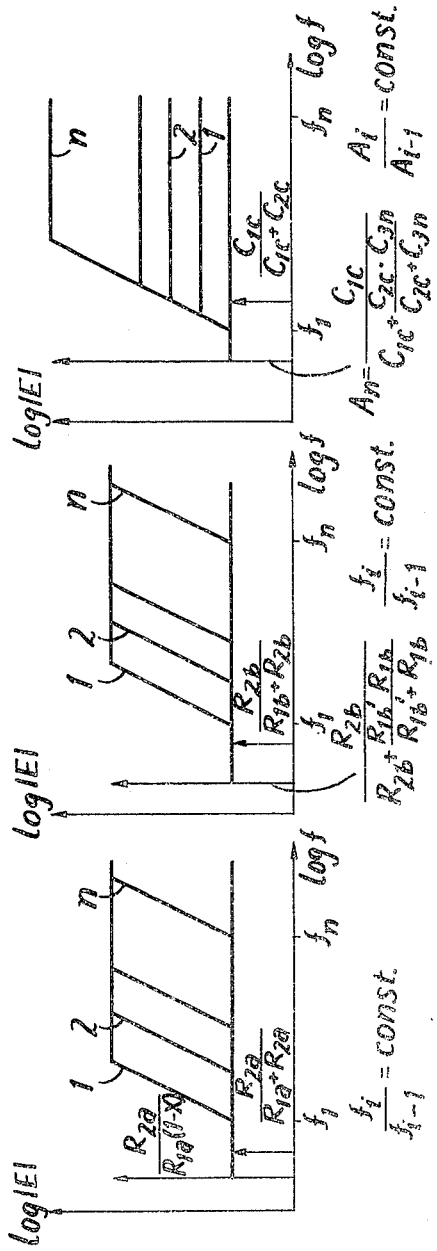

JITTER CORRECTING SYSTEM USING A PSEUDO COMPOSITE VIDEO SIGNAL FOR USE IN A VIDEO REPRODUCTION APPARATUS

BACKGROUND OF THE INVENTION

1. Field of the Invention

The present invention relates to a jitter correcting system in a video reproducing apparatus. More specifically, the present invention relates to a pseudo television composite signal generating apparatus for use in such a jitter correcting system in a video reproducing apparatus.

2. Description of the Prior Art

When a television image is reproduced on the screen of a television receiver in accordance with the composite video signal reproduced by a video reproducing apparatus, such as a video disc player or the like, a jitter is liable to be caused and as a result of weaving of the television image along the vertical direction. Such jitter occurs in accordance with the phase difference caused between the phase of the composite video signal applied from a video reproducing apparatus to a television receiver and that of a horizontal deflection signal obtained from an automatic frequency control normally included in such a television receiver generated upon extraction of the horizontal synchronizing signal in the said composite video signal. Such a phase difference between a composite video signal and a horizontal deflection signal is caused in a television receiver, because a video reproducing apparatus reproduces a composite video signal from a television signal recorded medium with relatively low accuracy in terms of the reproduced signal phase determined by a mechanical structural characteristic thereof, whereas an automatic frequency control serves to stabilize the frequency of a horizontal deflection signal in an electronic manner. Accordingly, it is possible to reduce the jitter appearing on the screen with relative simplicity when a television receiver has been structured such that the time constant of the automatic frequency control can be externally adjusted with ease to a smaller value. However, as is the case of television receivers widely used nowadays in homes, the time constant of the automatic frequency control cannot be adjusted with ease by the user and the receivers are often used as a monitor television receiver for the purpose of reproduction of the video signal obtained from a video reproducing apparatus for domestic use, such as a video disc player or the like. Thus the above described approach for changing the time constant of the automatic frequency control requires that a monitor television receiver be remodelled for the purpose; however, this cannot be adopted mainly from the viewpoint of service of domestic television receivers.

A prior art of interest to the present invention is U.S. Pat. No. 3,681,522, issued Aug. 1, 1972 and entitled "System for Minimizing Fluctuations of Television Signal", which discloses an improved jitter correcting system that is capable of eliminating with simplicity such a jitter in a monitor television receiver without any remodeling of the receiver. According to the art disclosed therein, a reproduced composite video signal obtained from a video reproducing apparatus is not directly applied to a monitor television receiver but rather the reproduced composite video signal is adapted to undergo phase modulation of the horizontal synchonizing signal in the said composite video signal so as not to cause the above discussed phase difference between the composite video signal and the horizontal deflection signal in the receiver and the resultant composite video signal with the phase modulated of the horizontal synchronizing signal is applied to a monitor television receiver. In other words, the referenced United States Patent is, as a matter of principle, aimed to phase modulate the horizontal synchronizing signal of the reproduced composite video signal by the amount corresponding to the phase difference between the composite video signal to be applied to a picture tube of a monitor television receiver and an output signal from an automatic frequency control included in the said monitor television receiver, so that the phase difference caused by the video reproduction apparatus is compensated for in advance. In comparison with the above described approach for changing the time constant of an automatic frequency control in a monitor television receiver with the approach for compensating in advance for the phase difference in question, the latter approach is much more advantageous in that the latter approach can compensate for the phase difference in question completely, while the former approach cannot make the phase difference in question be zero.

In the jitter correcting system disclosed in the referenced United States Patent, in order to minimize a jitter, adjustment should be made of the system such that a modulating signal for phase modulating the horizontal synchronizing signal of the reproduced composite video signal copes better with the frequency characteristic of the automatic frequency control included in the monitor television receiver. In the event such a frequency characteristic of an automatic frequency control in a receiver is known in advance, it is easier to design an adjusting means in such a jitter correcting system so as to be adapted to such a frequency characteristic of the automatic frequency control. However, since as a matter of practice television receivers now widely used in homes exhibit a variety of frequency characteristics in the automatic frequency control thereof, it is not always easier to provide an adjusting means in such a jitter correcting system which is adapted to the respective cases. The referenced United States Patent fails to disclose any of such an adjusting means adaptable to a variety of frequency characteristics of the automatic frequency control in different television receivers. Thus, the referenced United States Patent has room for improvement in practising the same.

SUMMARY OF THE INVENTION

Briefly stated, the present invention comprises a jitter correcting system in a video reproducing apparatus for reproducing a composite video signal of a given standard television system to be connected to a monitor television receiver including an automatic frequency control for a horizontal oscillator, comprising means for phase modulating the horizontal synchronizing signal of the reproduced composite video signal, by the amount associated with the phase difrence between the composite video signal to be applied to the picture tube of the monitor television receiver and the output signal of the automatic frequency control of the monitor television receiver, for providing a modified composite video signal with a phase modulated horizontal synchronizing signal, characterized in that said system further comprises means for generating a pseudo video composite signal including vertical and horizontal synchronizing signals and a marking signal in the video signal phase region wherein said horizontal synchronizing signal has been phase shifted as compared with that of the standard television system of said video reproducing apparatus for applying the said pseudo composite video signal through said jitter correcting system to said monitor television receiver, whereby said phase modulating means can be adjusted while observing the marking indication caused by said marking signal appearing on the screen of said picture tube.

In a preferred embodiment of the present invention, said horizontal synchronizing signal comprises two kinds of horizontal synchronizing signals, one being advanced, while the other being delayed, so that two indications may appear on the screen of the picture tube. Accordingly, adjustment of said phase modulating means can be effected such that said two indications come nearer each other. As a result, adjustment of said phase modulating means is facilitated. Preferably, the advanced horizontal synchronizing signal and the delayed horizontal synchronizing signal are included in the pseudo composite video signal such that one field of the advanced horizontal synchronizing signal and the other field of the delayed horizontal synchronizing signal come alternately in a field sequence manner. Preferably, the start of each field is shifted from the vertical synchronizing signal, so that two indication lines caused by the marking signals are crossed at the position spaced apart from the upper or lower edge of the screen on the picture tube of the television receiver, with the result that the characteristic of the automatic frequency control and thus the state of adjustment may be observed on the screen with ease.

Such a pseudo composite video signal may be recorded in advance in a recording medium of a video reproducing apparatus, such as a video tape or a video disc. Alternatively, such a pseudo composite video signal may be generated by an electronic circuit implemented for that purpose. Such a circuit may be implemented with relative simplicity.

Therefore, a principal object of the present invention is to provide a jitter correcting system in a video reproducing apparatus comprising a jitter correcting circuit having an adjusting means adaptable with ease to an automatic frequency control of a monitor television receiver which is coupled to said video reproducing apparatus.

Another object of the present invention is to provide a jitter correcting system in a video reproducing apparatus comprising a jitter correcting circuit having an adjusting means wherein adjustment of said adjusting means can be made with ease and simplicity by a user while the screen of a picture tube of a monitor teleivision receiver is observed.

A further object of the present invention is to provide a jitter correcting system in a video reproducing apparatus comprising a jitter correcting circuit having an adjusting means and a pseudo composite video signal generating means for generating a pseudo composite video signal for causing an indication on the screen of a picture tube of a monitor television receiver indicative of a state of adjustment of said adjusting means in conjunction with the characteristic of an automatic frequency control of the monitor television receiver.

Still a further object of the present invention is to provide a jitter correcting system in a video reproducing apparatus comprising means for phase modulating the horizontal synchronizing signal of the reproduced composite video signal, means for adjusting the amount of said phase modulation, and means for generating a pseudo composite video signal for causing an indication on the screen of the picture tube indicative of the adjustment of said asjusting means, wherein said phase modulating means comprises means for detecting the jitter component of the reproduced synchronizing signal, said jitter component detecting means being of a speed detecting type, i.e. a type for detecting a time differentiation of phase variation, whereby the frequency characteristic of a jitter detecting signal is improved.

Still a further object of the present invention is to provide a jitter correcting system in a video reproducing apparatus comprising means for phase modulating the horizontal synchronizing signal of the reproduced composite video signal and means for generating a pseudo composite video signal for causing an indication on the screen of a picture tube of a monitor television receiver indicative of the state of adjustment of said phase modulating means, wherein said phase modulating means comprises means for detecting the jitter component of the reproduced synchronizing signal, wherein a jitter component is adapted to be detected based on the train of pulses corresponding to the trailing edge of the reproduced horizontal synchronizing signal included in the reproduced composite signal, whereby accuracy of the jitter detecting signal is improved.

These objects and other objects, features, advantages and aspects of the present invention will become more apparent from the following detailed description of the present invention when taken in conjunction with the accompanying drawings.

BRIEF DESCRIPTION OF THE DRAWINGS

FIGS. 4A-4D shows transfer characteristics of an automatic frequency control of a horizontal oscillator included in a monitor television receiver;

FIGS. 5A-5C shows transfer characteristics of an adjusting circuit included in the FIG. 1 embodiment;

FIGS. 9A-9C shows schematic diagrams of several embodiments of a phase adjusting circuit in the said adjusting circuit in the FIG. 1 embodiment;

FIGS. 10A-10C shows the respective transfer characteristics of the embodiments shown in FIG. 9.

DESCRIPTION OF THE PREFERRED EMBODIMENTS

Figure 1:
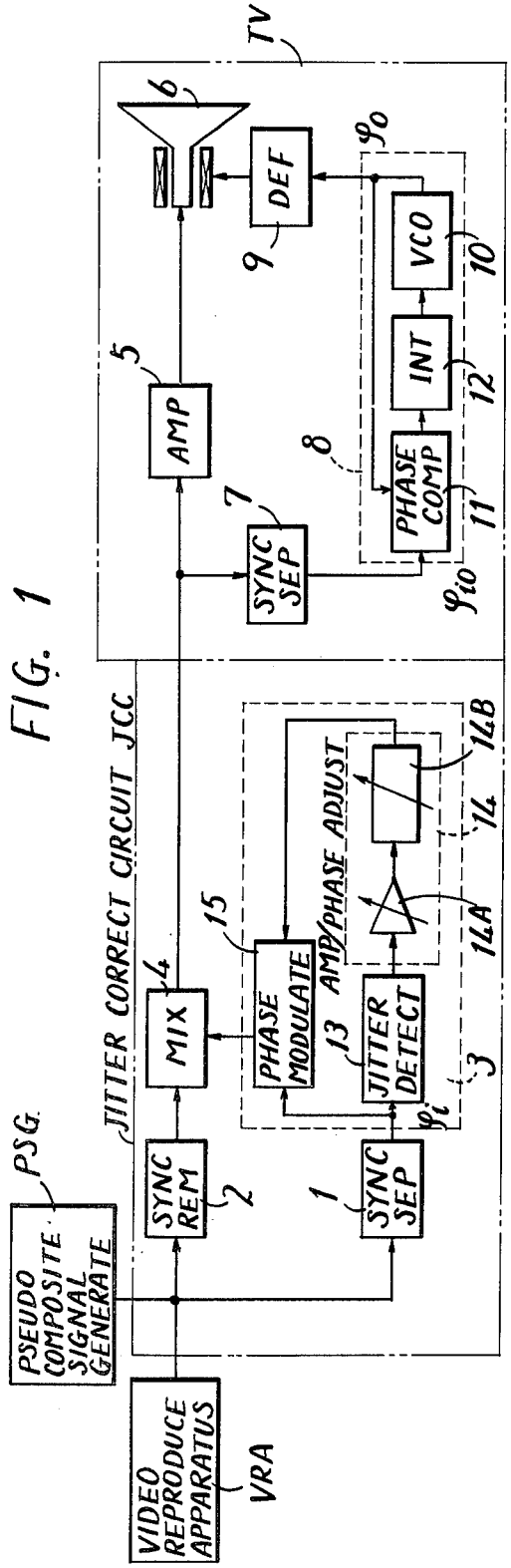
FIG. 1 is a block diagram of a jitter correcting system in accordance with the present invention.

FIG. 1 shows an embodiment of a jitter correcting system in accordance with the present invention. Basically, the embodiment shown comprises a jitter correcting circuit JCC connected between a video reproducing apparatus VRA such as a video disc player and a monitor television receiver TV. The input of the jitter correcting circuit JCC is connected to receive a pseudo composite video signal from a pseudo composite video signal generator PSG. Although the pseudo composite video signal generator PSG is shown provided independently of the video reproducing apparatus VRA and the jitter correcting circuit JCC in the embodiment shown, the generator PSG may be provided within the jitter correcting circuit JCC in the form of an electronic circuit or it may be included in the video reproducing apparatus VRA in the form of a recording medium with a pseudo composite video signal recorded thereon, as to be more fully described subsequently. The jitter correcting circuit JCC is supplied with the reproduced composite video signal from the video reproducing apparatus VRA. More specifically, the jitter correcting circuit JCC comprises a synchronizing signal separator circuit 1 for separating the horizontal synchronizing signal from the reproduced composite video signal, a synchronizing signal removing circuit 2 for removing the horizontal synchronizing signal from the reproduced composite video signal, a horizontal synchronizing signal phase modulating circuit 3 for phase modulating the separated horizontal synchronizing signal and a mixing circuit 4 for mixing the video signal from the synchronizing signal removing circuit 2 with the horizontal synchronizing signal removed therefrom and the phase modulated horizontal synchronizing signal from the horizontal synchronzing signal phase modulating circuit 3 for providing a synthesized composite video signal which includes a phase modulated horizontal synchronizing signal. On the other hand, the monitor television receiver TV comprises a video signal line, including an amplifier 5 for amplifying the said synthesized composite video signal for supplying the amplified signal to a picture tube 6, and a deflection system line, where the said synthesized composite video signal is applied to a horizontal synchronizing signal separator 7 and the separated horizontal synchronizing signal (as phase modulated as described previously) is applied to an automatic frequency control 8, the output of which is applied to a deflection circuit 9 for driving a horizontal deflection coil of the picture tube 6.

The automatic frequency control 8 of the monitor television receiver TV comprises a voltage controlled oscillator 10 adapted to oscillate in the vicinity of the horizontal frequency, a phase comparator 11 for phase comparing the separated horizontal synchronizing signal (as phase modulated) and the output from the voltage controlled oscillator 10, and an integrator 12 for detecting an average level of the error component for controlling the voltage controlled oscillator.

Assuming that the open loop transfer function of the automatic frequency control 8 is F(s), the following equation is established between the phase $\phi_{i0}$ of the input signal and the phase $\phi_0$ of the output signal, as well known to those skilled in the art.

$$\phi_0 = \frac{F(s)}{1 + F(s)} \phi_{i0} \quad (1)$$

Meanwhile, the open loop transfer function F(s) may be expressed as follows in terms of the frequency characteristic G(s) of the integrator, including the gain of the voltage controlled oscillator and the phase comparator.

$$F(s) = G(s)/s \quad (2)$$

The horizontal synchronizing signal phase modulating circuit 3 may be adapted to be adjustable such that the transfer function C(s) may be equal to a reciprocal expression of the closed loop transfer function F(s)/1 + F(s) of the automatic frequency control, so that the phase difference between the composite video signal applied to the picture tube 6 and the output signal from the automatic frequency control 8 may be eliminated. To that end, the phase modulating circuit 3 is structured such that the transfer function C(s) thereof may be expressed as follows.

$$C(s) = \frac{F(s) + 1}{F(s)} = 1 + \frac{s}{G(s)} \quad (3)$$

In the equation (3), a circuit configuration for performing the component $s$ may be implemented by employing a jitter detecting circuit of a speed detecting type for detecting the time differentiation of the phase variation of the separated horizontal synchronizing signal for the purpose of detecting a jitter. Furthermore, a circuit configuration for performing the component 1/G(s) may be implemented by employing an amplitude/phase adjusting circuit that can be adjusted such that the transfer function E(s) thereof may be $E(s) = 1/G(s)$.

The horizontal synchronizing signal phase modulating circuit 3 basically comprises a jitter detecting circuit 13 of a speed detecting type, an amplitude/phase adjusting circuit 14 and a phase modulator 15, connected as shown in the figure.

Figure 2:
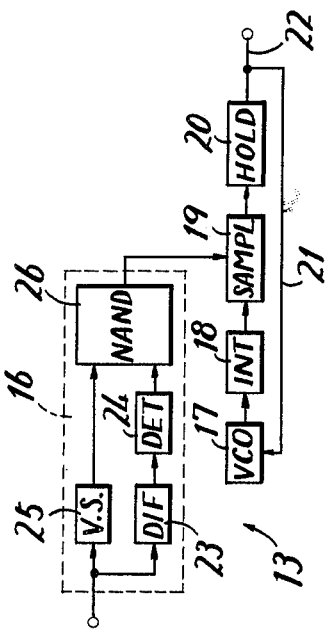
FIG. 2 is a block diagram of a jitter detecting circuit included in the FIG. 1 embodiment.

FIG. 2 shows an embodiment of a jitter detecting circuit 13 of a speed detecting type exhibiting an excellent frequency characteristic. The detecting circuit shown comprises a preprocessing circuit 16 for removing the horizontal synchronizing signal in the vicinity of the vertical synchronizing signal as to be described subsequently. A voltage controlled oscillator 17 is adapted to oscillate in the vicinity of the horizontal frequency, an integrator 18 integrates the output from the voltage controlled oscillator 17, a sampling circuit 19 samples the output from the integrator 18 and the output from the above described preprocessing circuit 16, a holding circuit 20 holds the output from the sampling circuit 19, a connection 21 provides the output from the holding circuit to the voltage controlled oscillator 17 as a control signal, and an output connection 22 withdraws the jitter detected signal from the holding circuit 20.

The above described preprocessing circuit 16 comprises a differentiation circuit 23 for differentiating the reproduced horizontal synchronizing signal in the separated synchronizing signals, a level detecting circuit 24 for level detecting the differentiated output from the differentiation circuit 23 at a predetermined level of a differentiated output, a vertical synchronizing signal separator circuit 25 for separating the vertical synchronizing signal from the separated synchronizing signals obtained from the synchronizing signal separator 1, and a NAND gate 26 for NAND processing the output from the level detecting circuit and the separated vertical synchronizing signal.

Figure 3A:
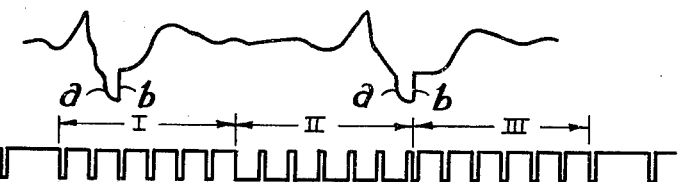
FIGS. 3A-3J shows waveforms for use in explanation of the operation of the FIG. 2 embodiment.

Referring to FIG. 3A showing the waveform of the composite video signal actually reproduced from a video reproducing apparatus such as a video disc player, it is observed that such reproduced composite video signal is of less sharpness at the leading edge of the horizontal synchronizing signal as compared with that at the trailing edge thereof, when the leading edge (the fall portion $a$) of the horizontal synchronizing signal is compared with the trailing edge (the rise portion b) of the horizontal synchronizing signal. The reason is presumed to be that because of a limited frequency band width of the video signal in the video disc player a portion giving rise to an abrupt change becomes dull in the wave shape and the fact that the leading edge of the horizontal synchronizing signal is preceded by the video signal immediately before the leading edge brings about such an abrupt change, which causes poor sharpness of the leading edge of the horizontal synchronizing signal. Therefore, the signal for detecting a jitter is preferably obtained from a pulse train formed from the trailing edge of the horizontal synchronizing signal which is of a better sharpness, i.e. is preferably obtained from a train of pulses corresponding to the trailing edge of the reproduced horizontal synchronizing signal for the puspose of better precision.

FIGS. 3B–3F shows the waveforms of the signals in the vicinity of the vertical blanking obtainable at several portions in the preprocessing circuit 16 shown in FIG. 2. Referring to the waveform in FIG. 3B the wave form may be divided into three portions I, II and III. Portion I is the front equilization pulse period, portion II is the vertical synchronization period and portion III is the equilization pulse. Portions I, II and III comprise the vertical synchronization signal portion. It is observed that the horizontal synchronizing signal is comprised of two for one horizontal scanning period (1H) during the period of the front equalizing pulse, vertical synchronizing pulse and the rear equalizing pulse. For simplicity of description in the present specification, the period including the front equalizing pulse, the vertical synchronizing pulse and the rear equalizing pulse is generally referred to as the "vertical synchronizing signal portion" hereinafter. It is understood that since the cycle of pulses obtained from the trailing edge of the reproduced horizontal synchronizing signal during the above described "vertical synchronizing signal portion" is different from that of the pulses obtained in the other portion of the reproduced composite video signal, it is necessary to remove the pulses corresponding to the trailing edge of the horizontal synchronizing signal during the period of the above described vertical synchronizing signal portion for the purpose of detecting a jitter based on a train of pulses corresponding to the trailing edge of the reproduced horizontal synchronizing signal. The above described preprocessing circuit 16 is aimed to perform the foregoing purpose. The detailed operation of the preprocessing circuit 16 will be described in the following with simultaneous reference to the waveforms shown in FIGS. 3G–3J.

Figure 3B:
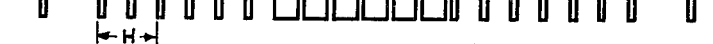
Figure 3C:
Figure 3D:
Figure 3E:
Figure 3F:
Figure 3G:

The differentiation circuit 23 is supplied with the separated synchronizing signal in the waveform a in FIG. 3B and provides a differentiated output in the waveform shown in FIG. 3C. The differentiated output is applied to the level detecting circuit 24 and only a portion of the output exceeding the level as shown in the waveform in FIG. 3C is withdrawn by way of an output signal therefrom in the waveform in FIG. 3D. On the other hand, the vertical synchronizing signal separator circuit 25 serves to separate the vertical synchronizing signal of the waveform shown in FIG. 3E from the separated synchronizing signal as inputted. The vertical synchronizing signal is separated with a slight delay as compared with the actual vertical synchronizing signal, because the vertical synchronizing signal separator circuit normally comprises an integrating circuit therein. The NAND gate 26 receives the output from the level detecting circuit 24 and the separated vertical synchronizing signal to provide an output in the waveform shown in FIG. 3F. From the waveform in FIG. 3F, it is observed that only the pulses corresponding to the trailing edge of the reproduced horizontal synchronizing signal occurring in the period where the above described vertical synchronizing signal portion have been removed. Thus, a train of pulses corresponding to the trailing edge of the reproduced horizontal synchronizing signal that has been removed of those occurring in the above described vertical synchronizing signal portion is withdrawn as an output from the preprocessing circuit 16 and is applied to the sampling circuit 19.

Figure 3H:
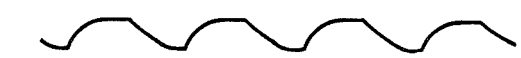
Figure 3I:
Figure 3J:

Now, an operation for withdrawing a jitter detected signal based on the output from the said preprocessing circuit 16 will be described with reference to the waveforms shown in FIGS. 3G–3J which shows the waveforms of the signals at the blocks 17, 18, 19 and 20 in the FIG. 2 circuit. The oscillation output of the waveform in FIG. 3G from the voltage controlled oscillator 17 is applied to the integrating circuit 18 and an integrated output in the waveform in FIG. 3H is withdrawn as a result of the integration. The integrated output is sampled by the sampling circuit 19 with the above described train of pulses corresponding to the trailing edge of the reproduced horizontal synchronizing signal removed from those occurring during the period of the above described vertical synchronizing signal portion, which is shown as the waveform in FIG. 3I. The sampled output is held in the holding circuit 20, while the held output in the waveform in FIG. 3J is fed back to the voltage controlled oscillator and is also applied through the output connection 22 to the amplitude/phase adjusting circuit 14 by way of a jitter detected signal.

Now the above described amplitude/phase adjusting circuit 14 will be described in more detail. The characteristic G(s) of the above described integrator, including the gain of the voltage controlled oscillator and the phase comparator in the monitor television receiver TV generally exhibits such as the frequency characteristic shown in FIG. 4A. Accordingly, the frequency characteristic of the transfer function E(s) of the said amplitude/phase adjusting circuit 14 should be adjusted as shown in FIG. 5A. From the practical viewpoint, it has been observed that the falling portion of the characteristics curve at the higher frequency region shown in FIG. 4A may be neglected and therefore the characteristic G(s) of the integrator, including the gain of the voltage controlled oscillator and the phase comparator may be deemed as shown in FIG. 4B. Therefore, the transfer function E(s) of the amplitude/phase adjusting circuit 14 may be selected as shown in FIG. 5B from the standpoint of practical use. Referring to FIG. 4B, assuming that the levels at the point of the frequencies $f_1(=1/2\pi T_0)$ and $f_2(=1/2\pi \alpha_0 T_0)$ are $K_0$ and $\alpha_0 K_0$, respectively, the transfer function G(s) of the integrator, including the gain of the voltage controlled oscillator and the phase comparator may be expressed as follows:

$$G(s) = K_0 \cdot \frac{1 + \alpha_0 T_0 s}{1 + T_0 s} \tag{4}$$

Therefore, the transfer function E(s) of the amplitude/phase adjusting circuit 14 must be the following equation:

$$E(s) = \frac{1}{G(s)} = \frac{1}{K_0} \cdot \frac{1 + T_0 s}{1 + \alpha_0 T_0 s} \qquad (5)$$

where $\alpha_0$, $K_0$ and $T_0$ are the constants to be determinable when the characteristic of the integrator, including the voltage controlled oscillator and the phase comparator is specified.

Accordingly, if the characteristics of the integrator, including the gain of the voltage controlled oscillator and the phase comparator has not been specified, as is clear from the above described equation (5), the variable parameters which must be adjusted in the amplitude/phase adjusting circuit 14 are variables $\alpha$, K and T associated with the above described $\alpha_0$, $K_0$ and $T_0$.

As a matter of principle, for the purpose of determining these three parameters, it is required that the frequency characteristic of the characteristic G(s) as shown in FIG. 4A or 4B is measured throughout the full frequency range, thereby to determine $\alpha$, K and T. Further it is required that the above described amplitude/phase adjusting circuit 14 have the transfer function E(s) so as to meet the above described equation (5) in accordance with these parameters. However, it is hardly possible to provide the required transfer functions to television receivers with a variety of the characteristics for the automatic frequency control which have already been installed in homes. Thus, it is understood that such an approach is quite impractical. In this context, the previously referenced United States Patent includes room for improvement.

By contrast, if the above described amplitude/phase adjusting circuit 14 can be adjusted so as to be properly adapted to the characteristic of the automatic frequency control of a monitor television receiver, without any specific consideration to the frequency characteristic of the automatic frequency control, while the screen of the picture tube of the monitor television receiver is looked at, it would be extremely convenient and advantageous. The present invention achieves that purpose, as fully described subsequently.

It has been observed that with a video disc player of the NTSC system wherein the video disc is adapted to be rotated at 30 revolutions per second a jitter component smaller than 30 Hz is perceived only slightly by a viewer on the screen of the picture tube of a monitor television receiver. It has also been known that in the light of the characteristic of the mechanical structure of this type of player the jitter component of 30 Hz and the harmonic waves thereof are dominant.

The automatic frequency controls of unknown characteristics in various monitor television receivers may be classified in one of the characteristic curves a, b and c in the characteristics shown in FIG. 4C, if and when such unknown characteristics of the different automatic frequency controls are classified based on the positional relation of the characteristic curves with respect to the above described frequency of 30 Hz. More specifically, there are three typical cases wherein the said frequency of 30 Hz comes to the flat portion of a higher frequency region as in the characteristic curve a, to the slope portion of the middle frequency region as in the characteristic curve b, and to the flat portion in the lower frequency region as in the characteristic curve c. Since the jitter component lower than the frequency of 30 Hz may be disregarded from the viewpoint of practical use, as previously observed, the respective characteristic thereof shown in FIG. 4C can be replaced by the characteristics a, b and c in FIG. 4D. Accordingly, the transfer characteristics to be required of the adjusting circuit 14 corresponding to the characteristics in FIG. 4D may be shown as the characteristics a', b' and c' shown in FIG. 5C. Therefore, if and when the adjusting circuit 14 is adjusted such that the parameter K at the frequency 30 Hz of the adjusting circuit 14 coincides with the value $K_1$, $K_2$ or $K_3$ of the corresponding type of the monitor television receiver, as classified previously as the characteristic curve a, b or c, then the jitter component of 30 Hz can be made not to appear on the screen of the picture tube of the corresponding monitor television receiver. Adjustment of this parameter K can be effected by adjusting the amplitude adjusting circuit 14A of the above described amplitude/phase adjusting circuit 14, while adjustment of the parameters $\alpha$ and T can be effected by adjusting the phase adjusting circuit 14B of the above described amplitude/phase adjusting circuit 14. It is important to make the latter adjustment such that the amplitude of the signal to be adjusted is not varied at the time of adjustment, as to be more fully described subsequently.

Now, description will be made of how the parameter K corresponding to the above described jitter component of 30 Hz is observed on the screen of the picture tube of a monitor television receiver and how adjustment of the parameter K is made. For the purpose of adjustment, the present invention employs a pseudo composite video signal specially prepared for the purpose of adjustment, which is applied to the signal input terminal of the jitter correcting circuit JCC so that the image of the pseudo composite video signal is displayed on the screen of the picture tube of a monitor television receiver, whereupon adjustment is made of the adjusting circuit 14 while the image on the screen of the picture tube is viewed.

Figure 6A:
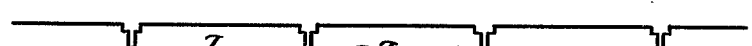
FIGS. 6A-6B and 7A-7B show waveforms of a pseudo composite video signal for use in the present invention.
Figure 6B:
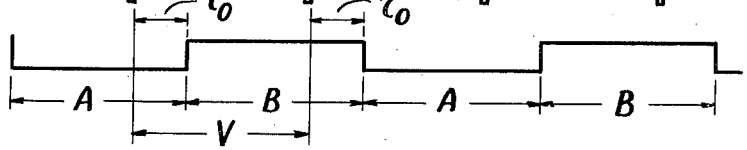
Figure 7A:
Figure 7B:
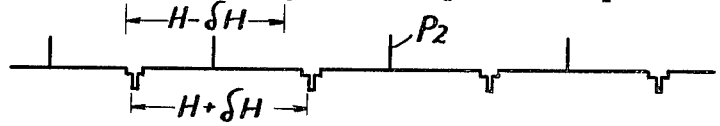

FIGS. 6A–6B shows the waveforms of the pseudo composite video signal with the time base on a reduced scale to depict a train of the vertical synchronizing signals and FIGS. 7A–7B shows the waveform of the said pseudo composite video signal with the time base on an enlarged scale to depict a train of the horizontal synchronizing signals. Referring to FIGS. 6 and 7, the pseudo composite video signal of the embodiment shown comprises, at a predetermined time $\tau_0$ after each vertical synchronizing signal, i.e. at every region A and B in FIG. 6, in a sequentially composed manner, a first adjusting signal shown in the waveform in FIG. 7A which comprises the horizontal synchronizing signal the repetition period of which is (H − δH) and which additionally comprises in a predetermined phase position, say in the center of each line of the first adjusting signal, and a first marking signal $P_1$, and a second adjusting signal in the waveform in FIG. 7B which comprises the horizontal synchronizing signal the repetition period of which is (H + δH) and which additionally comprises in a predetermined phase position, say in the center of each line of the second adjusting signal, a second marking signal $P_2$. Thus, it is pointed out that the ratio of the time period $t_1$ between the horizontal synchronizing signal and the first marking signal $P_1$ to the repetition period (H − δH) of the first adjusting signal is equal to the ratio of the time period $t_2$ between the horizontal synchronizing signal and the second marking signal $P_2$ to the repetition period (H + 2 δH) of the second adjusting signal. Referring to FIG. 1, the pseudo composite video signal generator PSG is structured to generate the above described pseudo composite video signal as shown in FIGS. 6 and 7. The pseudo composite video signal generator PSG will be described in more detail subsequently.

Figure 8A:
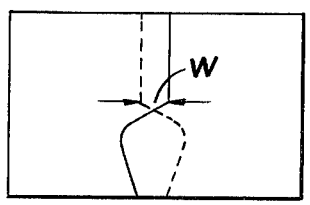
FIGS. 8A-8C is a view of the screen of a picture of a monitor television receiver wherein the said pseudo composite video signal is displayed.

When the above described pseudo composite video signal is applied through the jitter correcting circuit JCC to a monitor television receiver TV, a pair of lines as shown in solid and dotted lines in FIG. 8A appear on the screen of the picture tube of the monitor television receiver. More specifically, one horizontal period of the first adjusting signal portion is shorter than the standard one horizontal period. Therefore, the indication caused by the marking signal $P_1$ of the first adjusting signal tends to extend from the right upper region to the left lower region on the screen as shown in the solid line. On the other hand one horizontal period of the second adjusting signal portion is larger than the standard horizontal period H. Therefore, the indication caused by the marking signal $P_2$ on the screen tends to extend from the left upper region to the right lower region on the screen as shown in the dotted line. However, since the monitor television receiver includes an automatic frequency control, the monitor television receiver operates to bring the horizontal deflection in synchronism with the phase shifted horizontal synchronizing signals in accordance with the characteristic of the automatic frequency control. Hence, the indication lines caused by the marking signals $P_1$ and $P_2$ in the pseudo composite video signal tend to be curved so as to extend in the vertical direction in accordance with the characteristic of the automatic frequency control of the monitor television receiver. Thus, the manner of curving of these lines indicates the characteristic of the automatic frequency control of the monitor television receiver and thus corresponds to the step response of the automatic frequency control. As a result, the characteristic of the automatic frequency control of the monitor television receiver can be determined by looking at the screen of the picture tube of the receiver in accordance with the present invention.

Figure 8B:
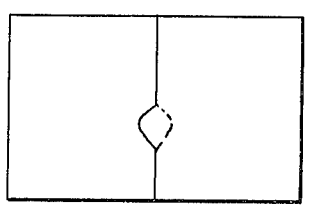

For the purpose of adjusting the adjusting circuit 14 of the jitter correcting circuit JCC, adjustment is made such that the above described respective lines come nearer each other, as seen in FIG. 8B. Since in the embodiment shown the first and second adjusting signals each corresponding to one field have been phase shifted by the time $\tau_0$ from the vertical synchronizing signal, the crossing of the above described two indication lines on the screen appears at the position on the screen dislocated from the upper or lower edge of the frame of the screen corresponding to the above described time $\tau_0$. Such dislocation of the crossing of these two lines is preferred, because such crossing is easy to observe when it is located near the center of the frame of the screen.

Figure 8C:
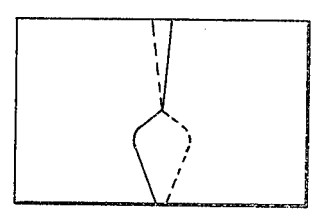

The distance W shown in FIG. 8A between the above described two lines appearing on the screen may be made broader or narrower by adjusting the above described amplitude adjusting circuit 14A, whereby the above described parameter K coincides with the corresponding parameter $K_1$, $K_2$ or $K_3$ of the respective automatic frequency control of a monitor television receiver employed when the distance W is made minimal. As seen in FIG. 8C, a situation can occur where the solid line and the dotted line do not come to coincide with each other, as opposed to the situation case shown in FIG. 8B. This is caused, because the above described phase adjusting circuit 14B has not been adjusted properly.

Now a specific embodiment of the above described phase adjusting circuit 14B will be described. As a matter of principle, the above described phase adjusting circuit 14B may be implemented in any configuration, insofar as the above described equation (5) is met. However, in consideration of the facility of adjusting the operation, it is preferred that the circuit is structured such that the parameter K previously set may not be varied in the course of adjusting the parameter $\alpha$ and T.

FIGS. 9A, 9B and 9C show several embodiments of the phase adjusting circuit meeting this requirement, and FIGS. 10A, 10B and 10C show the frequency response characteristics of the corresponding circuits, respectively.

The transfer characteristic of the first adjusting circuit shown in FIG. 9A may be expressed as follows.

$$E_a(s) = \frac{R_{2a}}{R_{1a} + R_{2a}} \cdot \frac{1 + T_{ia}s}{1 + \alpha_a T_{ia}s} \tag{6}$$

$$\left. \begin{array}{l} T_{ia} = C_{ia} \cdot R_{1a} \cdot x \\ \alpha_a = \dfrac{R_{1a} + R_{2a} - R_{1a} \cdot x}{R_{1a} + R_{2a}} \end{array} \right\}$$

$$1 \geq x \geq 0$$

wherein $f_{ia} = 1/2\pi T_{ia}$ being assumed, $C_{ia}$ is selected such that $f_{ia}/f_{(i-1)a} = C_{(i-1)a}/C_{ia} =$ constant is attained.

The transfer function of the second adjusting circuit as shown in FIG. 9B is expressed by the following equation.

$$E_b(s) = \frac{R_{2b}}{R_{1b} + R_{2b}} \cdot \frac{1 + T_{ib}s}{1 + \alpha_b T_{ib}s} \tag{7}$$

$$\left. \begin{array}{l} T_{ib} = C_{ib}(R_{1b} + R'_{1b}) \\ \alpha_b = \dfrac{R_{1b}R_{2b} + R_{1b}R'_{1b} + R'_{1b}R_{2b}}{(R_{1b} + R'_{1b})(R_{1b} + R_{2b})} \end{array} \right\}$$

where $C_{ib}$ is selected such that $f_{ib}/f_{(i-1)b} = C_{(i-1)b}/C_i =$ constant is attained in the similar manner.

The transfer characteristic of the third phase adjusting circuit as shown in FIG. 9C may be expressed by the following equation.

$$E_c(s) = \frac{C_{1c}}{C_{1c} + C_{2c}} \cdot \frac{1 + T_{ic}s}{1 + \alpha_{ic} T_{ic}s} \tag{8}$$

$$\left. \begin{array}{l} T_{ic}(C_{2c} + C_{3i})R_c \\ \alpha_{ic} = \dfrac{C_{1c}C_{2c} + C_{3i}C_{1c} + C_{3i}C_{1c}}{(C_{2c} + C_{3i})(C_{1c} + C_{2c})} \end{array} \right\}$$

wherein $C_{3i}$ is selected such that $\alpha_{ic}/\alpha_{(i+1)c} =$ constant is attained.

With any of these circuits used as a phase adjusting circuit 14B, the adjusting procedure of the amplitude/phase adjusting circuit 14 will be described in the following. First of all, the contact of a switch SW is connected to the terminal 0 and the gain of the above described amplitude adjusting circuit 14A is adjusted such that the said distance W appearing on the screen of the picture tube of the monitor television receiver is zero.

Then, the contact of the switch SW is advanced from the terminal 1 to each terminal $n$ in turn, while a variable resistor in the respective phase adjusting circuit as shown in FIG. 9A, 9B or 9C is varied each time a contact of the switch SW is connected to each terminal, until a terminal and a variable resistance position are found that exhibit the screen image shown in FIG. 8B with the above described two lines close to each other, whereby optimim adjustment of the jitter correcting circuit JCC can be performed so as to cope with the automatic frequency control of a monitor television receiver employed. Accordingly, it is appreciated that adjustment of the jitter correcting circuit JCC can be effected with extreme ease by the use of the above described pseudo composite video signal, while the image on the screen of the monitor television receiver for actual use is looked at.

Now the pseudo composite video signal generator PSG will be described in more detail in the following. Most practically, a recording medium such as a video disc or a video tape, particularly a recording medium for test use, may have recorded thereon the above described pseudo composite video signal as described with reference to FIGS. 6 and 7. In this embodiment, the recording medium is set on the video reproducing apparatus VRA for the purpose of video reproduction. The reproduced pseudo composite video signal thus obtained is applied through the jitter correcting circuit JCC to a monitor television receiver TV. In this embodiment, it follows that the pseudo composite video signal generator PSG is included in the video reproducing apparatus VRA. In this embodiment, some explanatory information about the adjusting method may be recorded in the portion before the recording portion where the above described pseudo composite video signal is recorded. In such an instance, even a user can make adjustment with ease and simplicity in accordance with the reproduced information.

Figure 11:
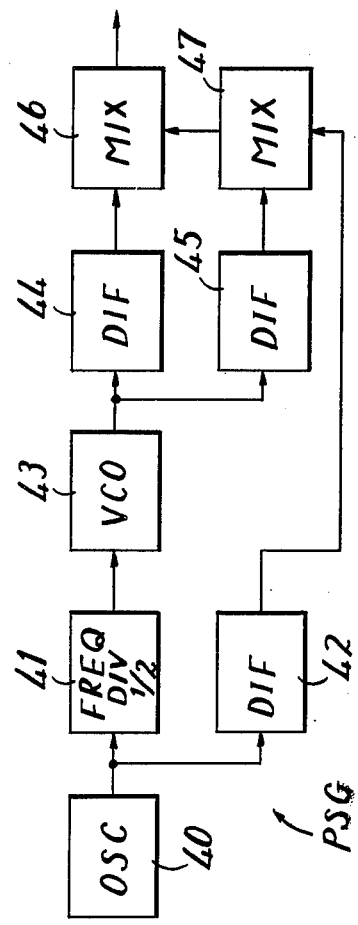
FIG. 11 shows a block diagram of a preferred embodiment of a pseudo composite video signal generator.

The above described pseudo composite video signal may be generated by a discretely implemented pseudo composite video signal generator. FIG. 11 shows a block diagram of a preferred embodiment of such a pseudo composite video signal generator PSG. The generator PSG shown comprises a precisely controlled oscillator 40 adapted to oscillate at a frequency of 60Hz. The oscillator 40 may comprise a multivibrator for generating a square wave. The output from the oscillator 40 is applied to a differentiation circuit 42, whereby the differentiated output is a vertical synchronizing signal. On the other hand, the output from the oscillator 40 is applied to a frequency divider of a half or a binary counter 41 and the output from the binary counter 41 is applied as a control signal to a voltage controlled oscillator 43, which is adapted to oscillate in the vicinity of the horizontal frequency. Again the oscillator 43 may comprise a multivibrator for providing a square wave output. The output from the oscillator 43 is applied to a differentiation circuit 45 and the differentiated output from the differentiation circuit 45 is a horizontal synchronizing signal. The horizontal synchronizing signal from the differentiation circuit 45 and the vertical synchronizing signal from the differentiation circuit 42 are mixed by a mixer 47, thereby to provide a set of synchronizing signals. On the other hand, the output from the oscillator 43 is again differentiated by a differentiation circuit 44 and the differentiated output of an opposite polarity to the differentiated output from the differentiation circuit 45 is provided as a marking signal. The marking signal from the circuit 44 and the set of synchronizing signals from the mixer 47 are mixed by a mixer 46, thereby to provide a desired pseudo composite video signal as shown in FIGS. 6 and 7.

In operation, the differentiation circuit 42 serves to generate the vertical synchronizing signal based on the square wave output from the oscillator 40, as described previously, while the binary counter 41 serves to provide a two-level output in synchronism with the generated vertical synchronizing signal. The voltage controlled oscillator 43 is responsive to the above described two-level output from the binary counter 41 to oscillate in the vicinity of the horizontal frequency such that the oscillation frequency is raised by one level of the above described two-level output while the oscillation frequency is lowered by the other level of the above described two-level output. The differentiated output of one polarity of these two sets of oscillation outputs is withdrawn as the horizontal synchronizing signals of the first and second adjusting signals $a$ and $b$ depicted with reference FIG. 7, while the opposite polarity differentiated outputs of these two sets of different frequency output is withdrawn as the marking signals $P_1$ and $P_2$ depicted with reference to FIG. 7. The above described vertical synchronizing signal, the two sets of horizontal synchronizing signals of different frequencies, and the marking signals are synthesized by the mixers 46 and 47, thereby to provide the desired pseudo composite video signal, as shown in FIGS. 6 and 7. It is understood that such a pseudo composite video signal generator PSG as shown in FIG. 11 may be built in the jitter correcting circuit JCC shown in FIG. 1. Alternatively, the above described first and second adjusting signals can be obtained with ease by creating an image with a flying spot scanner caused to scan the vertical line at the period $(H - \delta H)$ and $(H + \delta H)$, respectively.

In the embodiment described in the foregoing, the pseudo composite video signal comprises a pair of adjusting signals, the first and second signals $a$ and $b$, as described with reference to FIG. 7. Such an embodiment is most preferred in that adjustment can be made by bringing the two indication lines towards each other. Alternatively, however, only a single adjusting signal may be used for the purpose of adjustment in accordance with the present invention. Furthermore, the phase difference $\tau_0$ between the start of the respective adjusting signals and the vertical synchronizing signal may be made zero, in which event the crossing of two indication lines appearing on the screen of a picture tube is located in the vicinity of the top and bottom of the frame of the screen. It is pointed out that the present invention covers these modifications.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. A jitter correcting system in a video reproducing apparatus for reproducing a composite video signal of a given television system from a recording medium recorded with a composite video signal thereon, the reproduced composite video signal being applied through said jitter correcting system to a monitor television receiver having an automatic frequency control for horizontal deflection in the receiver, said composite video signal comprising a vertical synchronizing signal, a horizontal synchronizing signal and a video signal, said jitter correcting system comprising:

detector means responsive to the reproduced composite video signal for detecting a phase fluctuation in said reproduced composite video signal, compensating signal generating means responsive to said phase fluctuation detected output for providing a signal for compensating for the phase difference between the video signal and the output from said automatic frequency control caused by said automatic frequency control, said phase fluctuation causing a jitter on the screen of said monitor television receiver, means responsive to said compensating signal for phase modulating the horizontal synchronizing signal in said reproduced composite video signal for providing a modified composite video signal with a phase modulated horizontal synchronizing signal, adjusting means coupled to said compensating signal generating means for adjusting the generation of said compensating signal, and means coupled to said detector means for generating a pseudo composite video signal including a vertical synchronizing signal, a horizontal synchronizing signal and a marking signal in a predetermined phase position of the video signal region of said composite video signal, said horizontal synchronizing signal of said pseudo composite video signal being phase shifted as compared with that of said television system, said pseudo composite video signal being supplied through said jitter correcting system to said monitor television receiver in place of said reproduced composite video signal, whereby adjustment of said adjusting means is made while an indication by said marking signal in said pseudo composite video signal on the screen of said television receiver is observed.

2. A jitter correcting system in a video reproducing apparatus in accordance with claim 1, wherein said horizontal synchronizing signal in said pseudo composite video signal comprises a phase advanced horizontal synchronizing signal and a phase delayed horizontal synchronizing signal.

3. A jitter correcting system in a video reproducing apparatus in accordance with claim 2, wherein said television system includes an interlaced scanning system, and said phase advanced horizontal synchronizing signal being included in one field thereof and said phase delayed horizontal synchronizing signal being included in the other field thereof said fields being adapted to be arranged in a field sequence manner.

4. A jitter correcting system in a video reproducing apparatus in accordance with claim 3, wherein the field of said phase advanced horizontal synchronizing signal and the field of said phase delayed horizontal synchronizing signal are phase shifted with respect to said vertical synchronizing signal of said pseudo composite video signal.

5. A jitter correcting system in a video reproducing apparatus in accordance with claim 1, wherein the said means for generating said pseudo composite video signal comprises a recording medium with said composite video signal recorded thereon for reproduction by said video reproducing apparatus.

6. A jitter correcting system in a video reproducing apparatus in accordance with claim 1, wherein said means for generating said pseudo composite video signal comprises means for generating said vertical synchronizing signal of said pseudo composite video signal, voltage controlled oscillating means for generating said horizontal synchronizing signal of said pseudo composite video signal, means coupled to said vertical synchronizing signal generating means for controlling said voltage controlled oscillating means for causing said phase shift of said horizontal synchronizing signal of said pseudo composite video signal, means responsive to the output from said voltage controlled oscillating means for generating said marking signal, and means for mixing said vertical synchronizing signal, said horizontal synchronizing signal and said marking signal for providing said pseudo composite video signal.

7. A jitter correcting system in a video reproducing apparatus in accordance with claim 1, wherein said means for detecting a phase fluctuation of said horizontal synchornizing signal in said reproduced composite video signal comprises speed type detection means.

8. A jitter correcting system in a video reproducing apparatus in accordance with claim 7, wherein said speed type detection means comprises voltage controlled oscillating means, means for integrating the output from said voltage controlled oscillating means, means for sampling the output from said integrating means with the horizontal synchronizing signal of said reproduced composite video signal, and means for holding the output from said sampling means and for providing the held output to said voltage controlled oscillating means.

9. A jitter correcting system in a video reproducing apparatus in accordance with claim 1, wherein said means for adjusting the generation of said compensating signal comprises means for adjusting the amplitude of the output from said means for detecting a phase fluctuation of said reproduced composite video signal, and means for adjusting the phase of the output from said means for detecting a phase fluctuation of said reproduced composite video signal.

10. A jitter correcting system in a video reproducing apparatus in accordance with claim 9, wherein said phase adjusting means comprises a high pass filter, and transfer characteristic varying means.

11. A jitter correcting system in a video reproducing apparatus in accordance with claim 10, wherein said transfer characteristic varying means comprises multiple step switching means, a plurality of capacitor means connected to the respective steps of said multiple step switching means having different capacitance values, and variable resistor means coupled to said capacitor means.

12. A jitter correcting system in a video reproducing apparatus in accordance with claim 1, wherein said means for detecting a phase fluctuation of the horizontal synchronizing signal in said reproduced composite video signal comprises means responsive to the trailing edge of the horizontal synchronizing signal in said reproduced composite video signal.

* * * * *